April 21, 1970     F. F. HOLUB     3,507,765
METHOD FOR ELECTROCOATING A POLYAMIDE ACID
Filed May 5, 1966
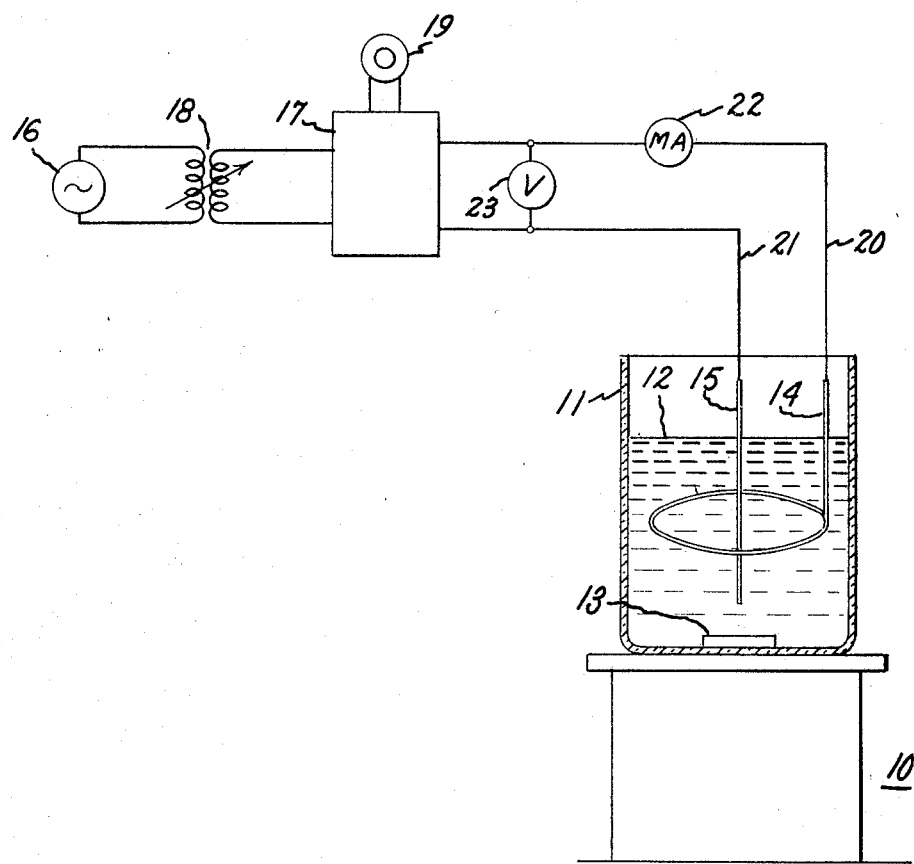
Inventor:
Fred F. Holub,
by Paul R. Webb, II
His Attorney.

(United States Patent Office)

3,507,765
METHOD FOR ELECTROCOATING A
POLYAMIDE ACID
Fred F. Holub, Scotia, N.Y., assignor to General Electric
Company, a corporation of New York
Filed May 5, 1966, Ser. No. 548,000
Int. Cl. C23b 13/00; B01k 5/02
U.S. Cl. 204—181                              4 Claims

ABSTRACT OF THE DISCLOSURE

An electrocoating method is provided involving the electrodeposition of a polyamide acid in the form of a mixture, for example, a solution, comprising an organic solvent, water, a polyamide acid, and a base in the form of an organic amine or an ammonium compound selected from ammonia and ammonium salts and mixtures of such ammonium compound and organic amine. The method provides electro-conducting substrates having electrodeposited polyamide acids which can be converted to high temperature polyimide films having valuable insulating and dielectric properties.

---

This invention relates to synthetic polymer compositions and methods of preparing such materials. More particularly, the invention is concerned with a process for making a polyamide acid solution which comprises (1) forming in water a mixture of ingredients comprising (a) at least one dianhydride selected from the group consisting of benzophenone dianhydride (e.g., 2,2',3,3'-, 2,3,3',4'-, 3,3',4,4'-benzophenonetetracarboxylic acid dianhydride), pyromellitic dianhydride, ethylene glycol bis trimellitate anhydride, and a dianhydride having the formula (I)

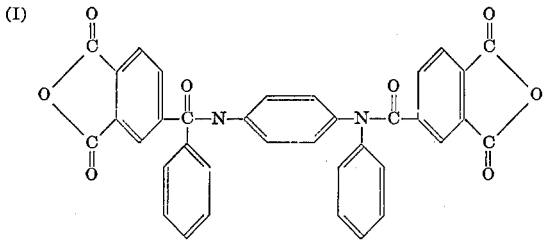

(b) at least one diamine selected from the group consisting of $C_{2-8}$ alkylenediamines, m-phenylenediamine, and diamines having the formula

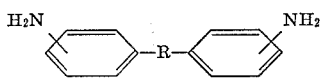

where R is a divalent radical selected from the group consisting of ammonia, ammonium salts of organic monocarboxylic acids, $C_{1-3}$ alkylene,

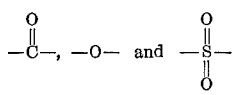

and (c) a water soluble amine selected from the group consisting of tertiary amines, and tertiary amines with secondary amines, and (2) allowing the reactants to interact at a temperature below 40° C., e.g., from 20° C. to ambient temperatures, such as 25 to 30° C., to form the polyamide acid substantially free of any polyimide groups derived from the polyamide acid. The invention also includes the employment of conducting solutions of polyamide acids, such as those described above, for electrocoating of various substrates.

U.S. Patent 3,179,614, issued Apr. 29, 1965, describes a class of resins comprising polyamide acid resins which are generally prepared by the reaction of a dianhydride of a tetracarboxylic acid with various diamines. The most widely used dianhydride is pyromellitic dianhydride, although this patent does describe a number of other dianhydrides. In accordance with this patent, the dianhydride and the diamine are reacted in the presence of a number of recited organic solvents for both the reactants and the intermediate polymeric acid amide. Additionally, this patent recites the need for employing solvents for the reaction which are relatively expensive and not readily available.

If cresol is used as the solvent in the preparation of a polyamide acid from a dianhydride such as benzophenone dianhydride and a diamine, the mixture must be heated to an elevated temperature of, for example, 100 to 160° C. to react the dianhydride and diamine since the reaction products are not soluble in this solvent at room temperature. It would be desirable to form such a polyamide acid in an inexpensive solvent of the polymer remained soluble at room temperature and exhibited a low solution viscosity to permit the use of the solution for coating purposes. After shaping or coating a substrate, the polyamide acid would be readily converted to the polyimide form by chemical or thermal means to produce products having excellent solvent resistance and resistance to flow at elevated temperatures.

Unexpectedly it has been discovered that it is possible to prepare such soluble polyamide acid resins in a water solvent without the necessity of using heat, which are substantially free of any polyimide groups. What is equally significant, it is possible to use such an inexpensive solvent to make the polyamide acid resin in solution and to carry out the reaction at room temperature rapidly by the addition of the above additive. The solubility and low solution viscosity of the water-additive system polymer results in improved ability to impregnate porous materials, easier coating of wires by means of dies, etc., at a high solids content. This was entirely unexpected and in no way could have been predicted because it had been believed that anhydrous conditions should be observed in making the polyamide acid resin. The use of this inexpensive mixture of water and additive has obviated the necessity of using expensive anhydrous solvents, for example, N - methyl - 2 - pyrrolidone, N,N - dimethylacetamide, or using heat with a cresol solvent.

I have unexpectedly discovered that the polyamide acid remains soluble in a water solvent even at room temperature and has a low solution viscosity if I incorporate in the solvent as the additive a water soluble tertiary amine, such as pyridine, dimethylethanolamine, N,N,N',N'-tetramethylbutanediamine, etc., or such a tertiary amine with a water soluble secondary amine, such as diethylamine, morpholine, etc. or an ammonium compound selected from ammonia or ammonium salts of organic monocarboxylic acids such as ammonium formate, ammonium acetate, ammonium propionate, etc. The amount of water in relation to the additive can be varied widely from 25 to 85 weight percent water. Thus, the amount of additive varies widely from 15 to 75 weight percent additive. As a further advantage of incorporating the amine additive in the above-described polyamide acid solution, it has been found possible to use the above conducting polyamide acid solutions for electrocoating the polyamide acids on metal substrates. These electrically deposited films can then be cured by the application of heat (about 150–300° C.) to form adherent polyimide coatings that serve as electrical insulation at high temperatures, have exceptionally high dielectric breakdown strength and protect the substrates against corrosion.

The term "electrocoating" as used herein is intended to mean a process whereby organic coatings are formed from electrically conducting polyamide acid solutions on electrically conducting surfaces by the action of a D.C. electric current. The surface on which deposition of the organic material i.e., the polyamide acid, occurs functions as an electrode. This electrode, in addition to another of opposite polarity is immersed in a conducting electrocoating bath of the type described in the present invention. Within the bath an imposed electric potential causes migration of the charged organic molecules, or in some cases, colloidal particles, to effect rapid deposition of the polyamide acid resins on the substrate being coated. In the present case, the electric coating bath was a polyamide acid solution in which negatively charged polymer molecules deposit on the anode.

In carrying out the reaction, it is preferable to add the diamine to the water solvent and stir after which the dianhydride and amine additive are added and stirred at ambient temperautres employing cooling, if necessary, to maintain the temperature of the mixture below 40° C. to avoid polyimide formation. The use of a continuous process for making these polyamide acids is especially served by the use of the amine additive in the solvent to take advantage of the solubility of the reactants and intermediate polyamide acid in the water solvent and the low cost of the solvent mixture.

The various diamines which have been found useful for reacting with the above-described dianhydrides are the various alkylenediamines, especially those in which the alkyl group contains from two to eight carbon atoms, e.g., ethylenediamine, propylenediamine, butylenediamine, 2-methylpropylenediamine, 1,2-diaminobutane, pentamethylenediamine, hexamethylenediamine, heptamethylenediamine, octamethylenediamine, etc. Of the various diaminobenzenes, m-phenylenediamine will give polymers with the carbonyl-diphthalic anhydrides which are soluble in the water solvent with the amine additive. Of the various binuclear diamines, those diamines in which one amino group is on each of the phenyl groups and the phenyl groups are separated by an alkylene, carbonyl, oxygen or sulfonyl radical will give polymeric products with the dianhydrides which are soluble in the water-additive solvent. Typical examples of such diamines are the various isomeric ortho-, meta- and para-oxydianilines, e.g., 2,2'-oxydianiline, 3,3' - oxydianiline, 4,4' - oxydianiline, 2,3'-oxydianiline, 2,4' - oxydianiline, 3,4' - oxydianiline, etc., the alkylene dianilines, especially those in which the alkylene group has from one to three carbon atoms, e.g., methylenedianiline, ethylidenedianiline, ethylenedianiline, propylidenedianiline, propylenedianiline, etc., including the various ortho-, meta- and para-isomers thereof, the various ortho-, meta- and para-isomers of diaminobenzophenone, and the various ortho-, meta- and para-isomers of sulfonyldianiline. Of these diamines, m-phenylenediamine (m-PDA), ethylenediamine, hexamethylenediamine, 4,4'-oxidianiline (ODA), 4,4' - methylenedianiline (MDA), and 4,4'-sulfonyldianiline are the most readily available. The alylenediamines generally produce polymeric imides with the carbonyldiphthalic anhydrides which have lower softening points and less resistance to oxidation at elevated temperatures than the polyimides prepared from the aromatic diamines listed above. Therefore, when such properties are required, it is preferred to use the aromatic diamines.

The initial temperature, before the addition of the diamine, should be about or below room temperature. After the addition of the diamine, the temperature usually rises 10 to 15 degrees, due to the fact that the reaction is exothermic. At these temperatures the addition reaction to form the polyamide acid is usually complete at the end of 30 minutes, as is shown by the increase in the viscosity of the reaction mixture. The cyclization reaction to form the polymeric imides proceeds advantageously at a temperature of about 125° C. to 300° C. to form a clear flexible film when cast on a glass substrate. In applying coatings or depositing films from solution, the temperature used to remove the water should be raised gradually to obtain smooth coatings and films.

Of the various dianhydrides, the most readily available and preferred dianhydrides are 3,3',4,4'-benzophenonetetracarboxylic acid dianhydride, which may be made in the manner described in U.S. 3,078,279—McCracken et al., pyromellitic dianhydride, ethylene glycol bis trimellitate anhydride, and the dianhydride of Formula I.

In forming the polymeric products it is only required to mix one or more of the dianhydrides with one or more of the above named amines and with one of the above named additives in the presence of the water solvent; they go into solution rapidly and appear to react almost instantaneously to produce a viscous polymeric amide acid solution which remains liquid and homogenous at room temperature. If desired, an inert atmosphere, e.g., nitrogen, can be used in the reaction vessel to retard oxidation of the amines to produce lighter colored polymers, since the stoichiometric proportions are one mole of amine to one mole of the dianhydride. It is preferred to use essentially equimolar amounts of the dianhydride and the diamine, although a slight excess, e.g., 1.05 moles of the amine per mole of the dianhydride, is advantageously used. Monoamines such as aniline, p-biphenylamine, benzylamine, or anhydrides of a dicarboxylic acid, such as phthalic anhydride or maleic anhydride, or other reagents reactive with amines or carboxylic acids, may be used to chain-stop or modify the polymers. These may be added at the start, during, or at the end of the polymer-forming reaction and may be used to react with any slight excess of either the diamine or dianhydride used initially.

The amount of aqueous solvent used should be sufficient to produce a homogenous solution with the reactants and polyamide acid polymer, and yet not be too viscous so as to introduce handling problems. Optimum concentrations are in the range of 5 to 40 percent, by weight, polymer, and 60 to 95 percent, by weight, solvent mixture, based on the end-use.

In order that those skilled in the art may better understand how the invention may be practiced, the following examples are given by way of illustration and not by way of limitation. All percentages are by weight, unless otherwise stated.

EXAMPLE 1

In this example, 20 grams of 4,4'-methylenedianiline (MDA) was dissolved in 150 ml. of distilled water and the mixture was stirred; then 32.3 grams of powdered 3,3',4,4'-benzophenonetetracarboxylic acid dianhydride (BPDA) and 15 ml. of pyridine was added to yield a heterogenous mixture. Three 15 ml. portions of pyridine were added and a viscous polymer solution was obtained on the addition of the last portion of pyridine. The exothermic temperature rise was controlled to keep it below about 40° C. The viscous polymer solution was then filtered to yield a very clear viscous yellow solution. A sample of this solution was cast on a glass substrate and heated for about 15 minutes from 25 to 300° C. slowly to give a tough, flexible, polymer foam. Another sample of the solution was cast on a glass substrate and placed in an oven at 80° C. A clear, transparent film was obtained which, on further heating to about 300° C gave a clear, tough, flexible yellow, insoluble polyimide film.

EXAMPLES 2–13

In Examples 2–7 and 9–12, BPDA was reacted with various diamines, such as m-phenylenediamine (m-PDA), 4,4'-oxydianiline (ODA), hexamethylenediamine (HMDA), 4,4' - methylenedianiline (MDA), and 1,3 - propanediamine (1,3-PD) in the same manner as was done in Example 1 with the exceptions that the proportions of the reactants, the additives, and the proportions of the additives and solvent were varied in order to form solutions of polyamide acids. In Example 8, ethylene glycol bis trimellitate anhydride (TDA) was used. In Example 13, pyromellitic dianhydride (PMDA) was used. Again, care was exercised to counteract the exotherm of the reaction and to keep the temperature as close to room temperature as possible. The following Table 1 shows the ingredients and proportions of ingredients used, and the kind of film or foam which was derived by casting the intermediate resin solution on a glass substrate and thereafter gradually heating the cast film for about 15 minutes at a temperature of about 30–300° C. to volatilize the solvent and to form the polyimide final product.

TABLE 1

| Ex. | Solvent (grams) | Additive solvent | Dianhydride Type | Grams |
|---|---|---|---|---|
| 2 | 34.4 | 50% pyridine, 50% water | BPDA | 6.44 |
| 3 | 41 | do | BPDA | 6.44 |
| 4 | 35 | do | BPDA | 6.44 |
| 5 | 34.4 | 50% dimethylethanolamine, 50% water. | BPDA | 6.44 |
| 6 | 34.4 | 50% N-ethylmorpholine, 50% water. | BPDA | 6.44 |
| 7 | 34.4 | 50% N,N,N',N'-tetramethylbutanediamine, 50% water. | BPDA | 6.44 |
| 8 | 24.0 | 50% pyridine, 50% water | TDA | 4.1 |
| 9 | 40.0 | 75% pyridine, 25% water | BPDA | 6.44 |
| 10 | 40.0 | 50% pyridine, 50% water | BPDA | 6.44 |
| 11 | 40.0 | 37.5% pyridine, 50% water, 12.5% diethylamine. | BPDA | 6.44 |
| 12 | 40.0 | 37.5% pyridine, 50% water, 12.5% morpholine. | BPDA | 6.44 |
| 13 | 40.0 | 50% pyridine, 50% water | PMDA | 4.40 |

| Example | Diamine Type | Grams | Room temp. solution | Films cast at 30–300° |
|---|---|---|---|---|
| 2 | m-PDA | 2.16 | Clear | Flexible. |
| 3 | ODA | 4.00 | do | Do. |
| 4 | HMDA | 2.32 | do | Do. |
| 5 | m-PDA | 2.16 | do | Do. |
| 6 | m-PDA | 2.16 | do | Foam. |
| 7 | m-PDA | 2.16 | do | Do. |
| 8 | MDA | 2.0 | do | Flexible. |
| 9 | MDA | 4.00 | do | Do. |
| 10 | 1,3-PD | 1.48 | do | Do. |
| 11 | MDA | 4.00 | do | Do. |
| 12 | MDA | 4.00 | do | Do. |
| 13 | MDA | 4.00 | do | Do. |

EXAMPLE 14

In this example, 3.04 grams of the dianhydride of Formula I (which can be prepared by the reaction under heat of 4-chloroformyl phthalic anhydride and N,N'-diphenylparaphenylene diamine in a solvent of trichlorobiphenyl in accordance with the procedure described in the copending application of Fred F. Holub, Ser. No. 440,387, filed Mar. 17, 1965, now Patent No. 3,440,215 and assigned to the same assignee as the present invention) was reacted with 1.0 gram of MDA in the manner described in Example 1. The 16.0 grams of solvent consisted of 75 percent pyridine and 25 percent water. After formation of a clear solution of the corresponding polyamide acid, the solution was cast on a glass substrate similarly as in Example 1 and the solvent removed by slowly increased heating for about 15 minutes at a temperature ranging upwardly from 25 to 300° C. A clear, tough, flexible film was obtained comprising a polyimide resin derived from the intermediate polyamide acid resin.

The following examples illustrate the ability to electrocoat polyamide acid solution with the above-described tertiary amine.

The apparatus, which was used in Examples 15 to 20 is described in the attached single figure drawing as it was employed in Examples 15 and 16. The modifications of this apparatus which were employed in Examples 17 to 20 are set forth below under the respective examples. The apparatus 10 comprised a glass electrocoating vessel 11 (in which deposition of a polymer 12 was made) supplied with means for agitation 13. The cathode 14 was a 50 mil copper wire ring, while the anode 15 was a 50 mil copper wire which was placed 3.5 cm. from cathode 14. An A-C voltage of about 110 volts was provided at a power source 16. A 12 volt battery charger 17 was connected to a 5-amp adjustable transformer 18 which was connected to the source of power 16. Battery charger 17 was regulated by a Variac 19. Leads 20 and 21 were connected to cathode 14 and anode 15, respectively. A milliampere meter 22 was connected to lead 20, while a voltage meter 23 was connected across leads 20 and 21. The power was turned on before immersing the anode and cathode into the stirred coating bath. While the following examples of successive coatings were obtained with the anode material made of copper, including copper wire, stainless steel, nickel, aluminum and brass are also usable for anode materials.

EXAMPLE 15

In the example, the solvent contained 85 weight percent water and 15 weight percent pyridine. 19.8 grams MDA was dissolved in 100 ml. of pyridine. 25 ml. of water was added to the solution. 32.2 grams BPDA were added to the solution and stirred at high speed for three minutes. The reaction mixture was cooled for seven minutes, whereby its temperature was kept below 40° C. 125 ml. of water was then added.

100 ml. of this conducting solution was placed in the electrocoating vessel described above and shown in the single figure of the drawing. 175 ml. of distilled water was added to further dilute the solution. Apparatus 10 was used for the electrocoating. After the power was turned on, a 50-mil copper wire ring used as the cathode and a straight 50-mil copper wire, the anode to be coated, were immersed in the solution which was stirred vigorously. The anode wire was placed within and spaced 3.5 cm. from the wire ring cathode. Two volts were applied between the electrodes by adjusting the Variac. The current was initially 15 ma. and decreased to 10 ma. in 30 seconds, at which time the electrodes were lifted out of the bath, with the power on. The coated wire, which was the anode, was rinsed with water leaving an adherent film, which coated wire was then suspended in an oven at 100° C. for one hour. After removal from the oven, the coated wire was tested for pinholes.

In this procedure, the coated wire was used as the cathode and an uncoated wire as the anode in a solution of sodium chloride in water with a few drops of phenophthalein in it. The presence of pinholes is shown by the phenolphthalein turning red from the cathodic electrolysis products formed at the pinholes. Two volts D-C were applied between the electrodes. The coated wire was then heated to 200° C. for one-half hour to convert the polyamide acid to the polyimide substantially pin-hole free state. The thickness of the film, measured with a micrometer, was approximately 0.3 mil. The electrodes in this example and in Examples 16–19 were prepared initially by cleaning the surface with fine steel wool, dipping in HCl, then in acetone, rinsing with distilled water and finally drying in air.

EXAMPLE 16

In this example, the same solution, electrode geometry, apparatus and method as described in Example 15 were followed. However, the initial applied voltage was 1.2 volts. This voltage was increased to 1.8 volts after 1½ minutes and 2.1 volts after 3 minutes. After ½ minute, the electrodes were removed from the bath. The current was 12 ma. initially, 6 ma. at 1½ minutes, 1 ma. at 3 minutes, and 0.75 ma. at 5 minutes. The coated wire was washed and put in an oven at 150° C. for one hour. The thickness of the film was approximately 1.3 mils.

EXAMPLE 17

In this example, 19.8 grams MDA were added to 80 ml. of pyridine after which 50 ml. distilled water were added. 32.2 grams BPDA were added and the mixture was stirred rapidly for five minutes. The mixture was allowed to stand for five minutes after which 100 ml. of distilled water were added. 50 ml. of the above conducting solution were placed in the electrocoating vessel described above and shown in the drawing. 75 ml. of distilled water were added to the solution.

Apparatus 10 was modified in that the electrodes used were 35 mil copper plates of 1 inch x 2 inches diameter to one face of each had been cemented a glass microscope slide. These plates were placed 2.5 cm. apart with the copper sides facing each other. Four volts were applied between the electrodes by adjusting the Variac. The current decreased from an initial value of 55 ma. to 11 ma. in one minute. The electrode were lifted out of the bath with the power on. The coated plate, which was the anode, was rinsed with water and heated at 100° C. for one hour, 150° C. for one hour, and 200° C. for 15 hours. The flat surface of the plate was pinhole free and smooth.

EXAMPLE 18

In this example, 50 ml. of the same solution as described above in Example 17 was placed in the same type of electrocoating vessel. 75 ml. distilled water were then added to the solution. The apparatus of Example 14 was modified in that the anode was a 35 ml. thick, 1 inch x 2 inches copper plate without any glass cemented to it, while the cathode was a straight piece of 50 mil. copper wire. The cathode positioned 2.5 cm. from the anode plate. Four volts were applied between the electrodes by adjusting the Variac. The current was initially 43 ma. and decreased to 39 ma. at one minute, 8 ma. at two minutes, and 2.9 ma. at three minutes, at which time the electrodes were lifted from the bath. The coated plate, which was the anode, was rinsed with water and heated at 100° C. for about ½ hour and at 150° C. for 2½ hours.

A determination was made of the breakdown voltage of the coating on the plate in which the coated copper plate was connected to ground and a rounded electrode placed firmly on the surface of the film or coating. The D-C potential difference between the rounded electrode and the grounded plate was increased until a short occurred. At two different locations on the plate the thickness of the film was measured as 0.35 mil and the breakdown strength at 2.9 and $3.3 \times 10^6$ volts/cm. The coated plate was then heated at 200° C. for 43 hours. The breakdown test was repeated at a different location on the plate and a breakdown strength of approximately $3.5 \times 10^6$ volts/cm. was obtained. This breakdown strength is at least 25 percent greater than the breakdown strength of a similar coated surface in which the coating was applied by dipping the surface in the same polyamide acid solution, evaporating the solvent and heating the polymer at elevated temperatures to convert it to the polyimide state.

EXAMPLE 19

In this example, 100 ml. of the same solution as described about in Example 15 was placed in the electrocoating vessel after which 150 ml. of distilled water were added. The apparatus was modified by employing a cathode which was a 1 inch x 2 inches copper plate and an anode which was a 50 mil copper wire. The copper plate cathode had one surface covered with glass and the other surface spaced 2.5 cm. from the wire anode. Five volts were applied between the electrodes by adjusting the Variac. The current was initially 50 ma. and decreased to 1.8 ma. in 15 seconds at which time the electrodes were lifted out of the bath with the power on. The coated wire, which was the anode, was rinsed with water and then placed in a 150° C. oven for two hours. The cured, coated wire was tough and flexible. It was stretched until it broke, and wrapped around itself in the standard "1X" test, without cracking, chipping or peeling of the coating.

EXAMPLE 20

In this example, 20 grams MDA were dissolved in 100 ml. pyridine, after which 50 ml. distilled water were added. 32.2 grams BPDA were then added to the solution and stirred for about one minute prior to the addition of 100 ml. of distilled water. This mixture was passed through a coarse, fritted glass filter.

The apparatus was modified by employing a 250 ml. stainless steel beaker which was used to contain the solution and function as the cathode. 50 ml. of the above solution were placed in the beaker and 75 ml. of distilled water were added. The anode was a copper box, having dimensions of 1 inch x 1 inch x ½ inch, which was open at the top. The seams were not soldered. Six volts were applied between the electrodes by adjusting the Variac. This voltage was maintained for two minutes. The copper box, which was the anode, was lifted out of the bath, drenched with distilled water, and heated at 100° C. for one hour. The copper box was coated evenly with a tough, cured polyimide film on the surface.

EXAMPLE 21

About 34.9 grams of distilled water and 60 grams of distilled phenol were mixed together. While agitating the mixture, 7.14 grams of ammonium hydroxide containing 28 percent, by weight, ammonia was added causing the former two-phase mixture to convert to a clear single phase liquid mixture in which the solvent was composed of 40 grams water, 60 grams phenol, and 2.0 grams dissolved ammonia. To this latter solvent mixture was added with stirring 4.124 grams methylene dianiline and 6.444 grams benzophenone dianhydride which, when interacted at below about 40° C. during a 15 minute period yielded a clear solution of 9.55 percent solids of the corresponding polyamide acid resin. A film cast from the solution on a glass substrate and thereafter cured at 200° C. for 5 minutes produced a tough, clear flexible film of the corresponding polyimide resin. The above-described polyamide solution was used as a bath for electrocoating a copper surface in the manner described in Example 19, using as a cathode, a flat copper plate 2″ x 1″ x 1/16″ placed 4.5 cm. from the metallic surface to be coated employing 5 volts for about 5 minutes. The deposited film was heated at about 150–165° C. for 15 minutes to obtain a 0.2 mil film which was clear and flexible.

EXAMPLE 22

To 9.8 grams distilled water was added 2.5 grams ammonium hydroxide (28% $NH_3$), 14.8 grams phenol and 4.124 grams MDA, adding the ammonium hydroxide to the water before the phenol. After vigorously stirring the mixture, 6.44 grams of BPDA was added and the mixture again stirred for about 15 minutes while maintaining the temperature of the reaction mixture below 40° C. To the viscous polyamide acid solution obtained, was added 68.8 grams additional distilled water and 1 gram of the aforementioned ammonium hydroxide and the contents further stirred to give a final polymer solution in which the solvent composition consisted of 84.6% water and 15.4% phenol with the ammonia concentration being 0.93%, by weight, of the solution. A film cast from the solution on a glass substrate and cured for 4 minutes at 250° C. was tough and flexible. In addition, this homogeneous resin solution was stable at room temperature even after seven days, and continued to yield tough, flexible polyimide films. This polyamide acid resin solution was used to electrocoat films on copper for five minutes at voltages up to 36 volts in the manner described above. After heating the electrocoated film for 4 minutes at 250° C., a tough, flexible polyimide film was obtained. One significant advantage in using a large concentration of water in the solvent was the fact that the "drip coat" adhering to the test piece after removal from the electrocoating bath and before curing to the polyimide stage, could be removed by rinsing with water without affecting the tough, compact, uncured electrocoating film adhering to the copper surface.

Although the utility of the polymer solutions of the present invention have been described in the above-mentioned patents principally in terms of applications as flexible films, it should be understood that these polymers may be used in other applications suitable for such compositions. Thus, these polyamide acid resins can be converted to polyimides and employed as insulation over a conducting core. Additionally, these polyimides can be employed over a conducting core previously coated with another polymer, or vice versa, to give laminated, insulated coatings on the wire to improve the properties of the insulation. They may also be used as dipping varnishes to impregnate coils of previously insulated wire, i.e., in the motor and generator rotors, field coils, etc. These resins may also be used in molding powder formulations, by mixing with various fillers, for example, wood flour, diatomaceous earth, carbons, silica, abrasive grains, e.g., Carborundum, diamond grit, etc. These polymers are also useful in preparing fibers, as impregnants, and bonding materials for metallic and fibrous laminates, etc. The polymers in film form are suitable as a dielectric in making capacitors, as slot insulation in motors, etc.

It has been found that in accordance with the process herein described that it is possible to synthesize completely aromatic polyamide acids in inexpensive water soluble amine systems without resorting to any heating. This simple direct process allows the preparation of coating solutions that are easily prepared and have greater flexibility on application to glass and metal surfaces. Since substantially no heating is required, very simple mixing technique may be applied to produce a polymer solution useful for bonding glass fibers, for making laminations and for coating metal substrates for use as thermal and electrical insulating films.

It will of course be apparent to those skilled in the are that other benzophenone dianhydrides and other diamines may be employed in place of those recited in the foregoing examples, many illustrations of these reactants being given previously, without departing from the scope of the invention. The ratio of reactants as well as the proportions of the solvent and amine additive may also be varied within the ranges recited above. It is also to be understood that the conditions of reaction, formation of intermediate polyamide acid, and of the ultimate polyimide product can also be varied widely in accordance with the intended invention. The incorporation of other additives, such as light stabilizers, oxidation inhibitors, levelling additives, etc., is not precluded.

In addition to the conducting aqueous solutions described above for electrocoating purposes, one can employ other conducting polyamide acid solutions without departing from the scope of the invention. Included among such conducting solutions are those disclosed in the copending application of Richard F. Gaertner and myself, Ser. No. 547,889 filed concurrently herewith and assigned to the same assignee as the present invention now U.S. Patent No. 3,448,068, issued June 3, 1969. By reference, this latter application is made part of the disclosure of the instant application.

What I claim as new and desire to secure by Letters Patent of the United States is:

1. In a process of effecting the deposition of a polyamide acid onto an electrically conducting substrate immersed in said polyamide acid, the improvement which comprises electrocoating the polyamide acid onto the substrate while the polyamide acid is in the form of a mixture comprising (A) the polyamide acid, (B) an organic solvent, (C) a base selected from ammonia, an organic amine and a mixture thereof, and (D) water, where (D) is utilized in an amount sufficient to render the mixture electroconducting and (A) is the product of reaction of at least one dianhydride selected from the group consisting of benzophenone dianhydride, pyromellitic dianhydride, ethylene glycol bis trimellitate anhydride, and a dianhydride of the formula,

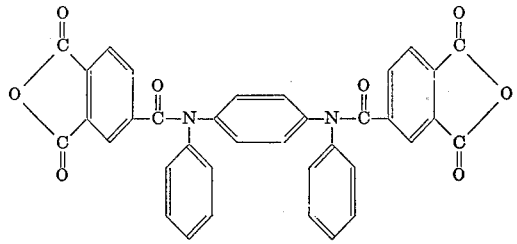

and at least one diamine selected from the group consisting of $C_{2-8}$ alkylenediamines, m-phenylenediamine, and diamines having the formula,

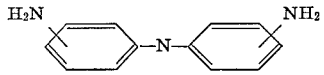

where R is a divalent radical selected from the group consisting of $C_{1-3}$ alkylene,

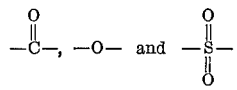

2. The process as in claim 1, in which the electrically conducting substrate is copper.

3. The process as in claim 1, in which the electrically conducting substrate is aluminum.

4. An electrocoating process as in claim 1, which comprises immersing an electrically conducting substrate in a conducting polyamide acid solution and effecting the deposition of the polyamide acid onto the substrate.

References Cited

UNITED STATES PATENTS

| | | | |
|---|---|---|---|
| 3,230,162 | 1/1966 | Gilchrist | 204—181 |
| 3,340,172 | 9/1967 | Huggard | 204—181 |
| 3,366,563 | 1/1968 | Hart et al. | 204—181 |

HOWARD S. WILLIAMS, Primary Examiner

UNITED STATES PATENT OFFICE
Certificate

Patent No. 3,507,765 Patented April 21, 1970

Fred F. Holub

Application having been made by Fred F. Holub, the inventor named in the patent above identified, and General Electric Company, a corporation of New York, the assignee, for the issuance of a certificate under the provisions of Title 35, Section 256, of the United States Code, adding the name of Marvin A. Peterson as a joint inventor, and a showing and proof of facts satisfying the requirements of the said section having been submitted, it is this 15th day of September 1970, certified that the name of the said Marvin A. Peterson is hereby added to the said patent as a joint inventor with the said Fred F. Holub.

FRED W. SHERLING
*Associate Solicitor.*

UNITED STATES PATENT OFFICE
CERTIFICATE OF CORRECTION

Patent No. 3,507,765  Dated April 21, 1970

Inventor(s) Fred F. Holub

It is certified that error appears in the above-identified patent and that said Letters Patent are hereby corrected as shown below:

Column 10, line 36, cancel the formula and substitute

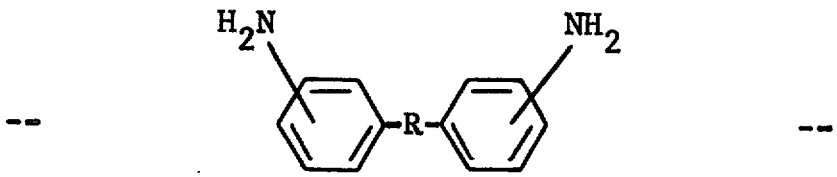

SIGNED AND
SEALED
DEC 8 1970

(SEAL)
Attest:

Edward M. Fletcher, Jr.
Attesting Officer

WILLIAM E. SCHUYLER, JR.
Commissioner of Patents